(12) United States Patent
Coppens

(10) Patent No.: US 6,447,880 B1
(45) Date of Patent: Sep. 10, 2002

(54) COMPOSITE LAMINATES AND THEIR PREPARATION

(75) Inventor: Daniel David Coppens, Newark, DE (US)

(73) Assignee: Anholt Technologies, Inc., Avondale, PA (US)

( * ) Notice: Subject to any disclaimer, the term of this patent is extended or adjusted under 35 U.S.C. 154(b) by 0 days.

(21) Appl. No.: 09/399,883

(22) Filed: Sep. 21, 1999

(51) Int. Cl.$^7$ .......................... B32B 27/12; B32B 27/08
(52) U.S. Cl. ...................... 428/174; 428/301.4
(58) Field of Search .............................. 428/301.4, 174; 156/196

(56) References Cited

U.S. PATENT DOCUMENTS

| 4,443,507 A | * | 4/1984 | Yamada et al. ............. 428/114 |
| 4,950,532 A | * | 8/1990 | Das et al. |
| H1542 H | * | 6/1996 | Elmendorp et al. .......... 428/904 |

FOREIGN PATENT DOCUMENTS

| EP | 391581 | * | 10/1990 | ............. B32B/7/10 |
| GB | 1301023 | * | 12/1972 | ............ B32B/27/04 |

* cited by examiner

Primary Examiner—Elizabeth M. Cole
(74) Attorney, Agent, or Firm—Huntley & Associates

(57) ABSTRACT

A process of making a complex, non-planar molded composite material from an amorphous thermoplastic and thermosetting resin.

20 Claims, No Drawings

COMPOSITE LAMINATES AND THEIR PREPARATION

BACKGROUND OF THE INVENTION

Composite materials consisting of carbon, glass or polymer fibers embedded in a continuous polymer matrix are well known means of providing strong, lightweight structures. Because of its extremely high strength, carbon is generally the material of choice for the fiber. Typically, the fiber is embedded in a thermosetting polymer, such as epoxy, and cured at elevated temperature and pressure to create the desired structure.

A multi-layer laminated structure of such a composite can be used to obtain different, and sometimes improved, properties such as increased strength and durability. These laminates are typically prepared using either thermoplastic or thermosetting resins. Prepregs can be used in the fabrication of finished articles. A prepreg is fibrous material that has been impregnated with a resin system and partly cured. However, combining prepregs with other materials in a single composite structure has been problematic. For example, thermoplastics and thermosetting resins have different physical properties and require different processing parameters. Thermoplastics are hard at room temperature but become soft upon heating. Thermoplastics generally have little or no cross-linking, and the individual chains of the polymer slip by one another upon heating, resulting in a softening of the material. Thermosetting resins, on the other hand, consist of a polymer that becomes highly cross-linked in three dimensions when cured and assumes a fixed shape in the fully cured condition. In addition to different physical properties, thermosets need relatively long, elevated temperature curing in a fixture that retains the shape of the desired object. Thermoplastics, on the other hand, use a shorter, elevated temperature molding operation that simultaneously forms the object into its final shape.

In order to take advantage of the beneficial properties of both thermoplastic materials and thermosetting prepregs in a single structure, the use of a film of thermoplastic adhesive has been proposed. However, thermoset resins do not chemically adhere to the film with sufficient strength and durability.

Jacaruso, et al. in U.S. Pat. No. 5,304,269, has proposed an alternative method of adhesion of thermoset composite structures. The method disclosed by Jacaruso includes the use of thermoplastic adhesive strips, which are comprised of a layer of semi-crystalline thermoplastic material such as polyetherketone, a layer of amorphous thermoplastic material, a ply of dry fiber reinforcement partially embedded in the layer of thermoplastic material, and a coating of thermoset resin over the exposed dry fiber. Initially, heat is applied to the structure to melt and fuse the semi-crystalline and amorphous thermoplastic adhesive strips by raising the temperature of the two layers above the melting point of the semi-crystalline thermoplastic material. Since the semi-crystalline thermoplastic has a higher melting temperature than amorphous thermoplastic, the two layers are fused together. The composite structure is then cured by conventional methods. This method, however, requires several processing steps and does not allow the formation of complex shapes in a single process step.

Therefore, due to the incompatibility of thermosetting and thermoplastic materials, laminated structures are generally prepared entirely from one or the other. This has hindered the development of laminated structures that combine thermoplastic and thermosetting resins with a strong enough bond that can be molded into complex shapes in a one step process.

SUMMARY OF THE INVENTION

The present invention overcomes the previously described limitations of using thermosets and thermoplastics in the same structure. The present invention not only overcomes these limitations but also enables the artisan to construct a composite material with high stiffness, insulating properties and improved x-ray transparency in a single process step.

The present invention provides molded composite materials of substantially uniform thickness and having a core of substantially amorphous thermoplastic and at least one outer layer of thermosetting resin bonded to each surface of the core. The core material and each outer layer are interfacially commingled to provide a bond strength of greater than about 500 psi. These composites can be used to form complex molded shapes of substantially uniform thickness.

The present invention further provides a process for the preparation of a complex molded composite material by assembling in matched molds a core of substantially amorphous thermoplastic and at least one outer layer of thermosetting resin adjacent each surface of the core, and applying heat and pressure to the assembled components sufficient to cure the thermosetting resin and form an interdiffusional bond at the interface between the core and each outer layer.

BRIEF DESCRIPTION OF THE DRAWINGS

FIG. 1 is a cross-sectional representation of a uncured composite laminate of the present invention.

FIG. 2A illustrates the placement of the uncured laminate of the present invention between two sides of a complex molding apparatus.

FIG. 2B illustrates the one step molding of the composite laminate into a complex shape.

FIG. 2C illustrates the separation of the two sides of a complex molding press and the resulting finished product.

FIG. 3 is a top view of the finished complex molded composite laminate of the present invention.

DETAILED DESCRIPTION OF THE INVENTION

The present invention provides a unique process for forming composite laminates that combine thermoset and thermoplastic polymers in the same structure and in a single process step.

A wide variety of thermoplastic core materials can be used in the present invention, selected to have a glass transition temperature within the curing temperature range of the thermosetting resin with which it is to be combined. The thermoplastic material should be substantially amorphous, that is, has low crystallinity. Preferred thermoplastic core materials that can be used in the present invention include acrylonitrile butadiene styrene (ABS), polyphenylene-oxide (PPO), and poly ether imide (PEI). In general, the thermoplastic core comprises about from 50 to 95% of the total thickness of the composite material.

The thermosetting component of the present laminates can similarly be selected from a wide variety of materials, so long as the curing temperature of the thermosetting component is in between the glass transition temperature and the melting point of the thermoplastic core. Preferably, the thermosetting resin is reinforced with at least one fiber. Prepregs are especially preferred. Prepregs, which have been found to be particularly satisfactory, include those with carbon reinforcement commercially available from Newport Adhesives as NCT-301-G150. Two or more layers of prepreg of the thermosetting component can be used to tailor the properties of the final product.

The thermosetting resin should be selected with a viscosity, which permits the thermoset to diffuse into the thermoplastic before the curing of the thermoset is complete, thus facilitating the formation of an interdiffusional bond. For interdiffusional bonding of a thermoplastic and a thermosetting resin, the bonding area is heated above the glass transition temperature of the amorphous thermoplastic polymer surface layer, and within the cure temperature range of the thermosetting components. When the laminate is heated above the glass transition temperature, the thermoset component diffuses into the thermoplastic and develops interfacial strength. The difference between the glass transition temperature and the melting temperature of the matrix material provides the working temperature window. Therefore, the appropriate selection of thermoplastic and thermoset systems is necessary to use the most convenient operating parameters.

One particular layering configuration of the present composites is uniquely suited to the molding of either planar or complex shapes. In that configuration, an amorphous thermoplastic core such as PPO is co-cured with prepreg face sheets. Amorphous resins, due to their lack of crystalline structure, provide a minimum of x-ray scatter. In addition, PPO has a glass transition temperature in the same range as the curing temperatures of many commercially available epoxies. Because of the similarities in the temperature ranges, complex shapes can be formed in one molding operation in which the prepreg and PPO are co-molded and both form into the required geometry.

An alternative embodiment of the present invention includes the use of at least one outer layer of fiber reinforced thermosetting resin. Still another embodiment includes the use of fiber reinforced thermosetting resin on either side of the thermoplastic core. Yet another embodiment of the present invention includes the use of alternating layers of substantially amorphous thermoplastic and fiber-reinforced thermosetting resin.

The composites of the present invention can also be made with film adhesive and dry fabric. A film adhesive is a thermoset resin adhesive that has been cast into a sheet and "B-staged," or partly cured. This material is then placed in a laminate and more fully cured under elevated temperature and pressure.

In the preparation of the laminates, the core material and at least one thermoset resin are placed in matched molds of the desired shape. FIG. 1 illustrates an uncured laminate of the present invention. The uncured laminate is composed of an amorphous thermoplastic core 10 surrounded by at least one layer of thermosetting material 11 on either side of the core 10. As shown in FIG. 2A, the flat, uncured composite laminate 20 is placed into a heated press containing an upper male mold 21 and lower female mold 22. The complex mold components are then pressed together to form the flat uncured laminate into the desired complex shape 23 as shown in FIG. 2B.

During the press, sufficient heat and pressure are applied to cure the thermosetting resin and form an interdiffusional bond between the core material and each adjacent layer of thermosetting resin. An interdiffusional bond forms between thermosetting and thermoplastic materials by diffusion of the thermoset into the thermoplastic. On heating, the thermoplastic material can allow the thermoset resin to diffuse into the thermoplastic before the thermosetting material fully cures.

The heat and pressure are maintained for the duration of the curing and forming process until the thermoset is substantially completely cured. As illustrated in FIG. 2C, the press is opened, thereby separating the upper and lower portions of the complex mold. The finished product 23 is then removed from the press and allowed to cool. A top view of the finished product 30 is shown in FIG. 3.

Preferred composite structures of the present invention have a core of an amorphous thermoplastic polymer with at least one layer of carbon fiber impregnated with thermoset resin on either side of the core. These structures provide excellent performance characteristics without the use of carbon fibers throughout the core of the composite. Sandwiching a layer of material, without reinforcing fiber, between two outer layers with fiber reinforcement results in a composite structure with several benefits. First, the cost of the composite is reduced because the carbon fiber reinforcement is no longer required in the core of the composite. Second, a stronger, more versatile composite results because the higher strength material is located at the surfaces where it is needed most for bending strength. In addition, combinations of thermoplastics and thermosets results in improved impact resistance.

In addition to the cost reduction and the improved efficiency of the structure, the laminates of the present invention exhibit unique and beneficial properties when used with x-rays. Carbon fiber based composites are desirable as x-ray transparent windows for components in x-ray applications because they have excellent mechanical properties and low x-ray absorption. However, carbon fiber has a highly aligned chemical structure, which causes x-ray scattering, and has a higher density than most polymers. In the composites of the present invention, an x-ray transparent sandwich panel is produced which has excellent structural capability provided by carbon fiber composite face sheets but exhibits reduced absorption and scatter because of its carbon fiber free polymer core.

Yet another unexpected beneficial property of the present invention includes the electrical insulating properties of the laminates. Experimental results indicate that the laminates provide astounding electrical insulation properties considering that composite contains highly conductive carbon fibers for structural support. Still other beneficial properties of the laminates of the present invention are increased vibration absorbency and sound deadening.

Not only are the laminates of the present invention versatile in that several prepreg materials can be used to form the outer layers of the laminates, but the laminates of the present invention can be used in a variety of commercial applications. For example, these laminates can be used as a non-conducting light weight outer shell for circuit boards or any other unit that requires electricity, or as a casing for use with x-ray technologies either in the medical field or in any physics experimentation involving x-rays.

Composite structures of the present invention can be used as enclosures in medical diagnostics and experimental physics equipment, where there is value in minimizing losses in transmitting x-rays from the source to the object of study. Especially in these applications, the composite structures of the present invention provide a combination of excellent performance characteristics, including lower x-ray absorption, due to the replacement of high absorption carbon fiber with low absorption polymer in the inner layer; lower x-ray scatter, due to the use of amorphous rather than crystalline polymer in the inner layer; and lower cost than simple carbon fiber-epoxy materials, due to the substitution of low cost thermoplastic polymer for high cost carbon fiber-epoxy in a substantial portion of the structure.

While there are shown and described certain specific structures embodying the invention, it will be understood by those skilled in the art that various modifications and rearrangements of parts can be made without departing from the spirit and scope of the underlying inventive concept and the same is not limited to the particular forms herein shown and described. The present invention is further illustrated by the following specific examples, which are presented by way of illustration only and are is not to be considered as being limiting.

EXAMPLE 1

A 100 mil thick laminate was prepared by assembling multiple layers of prepreg material on either side of a thermoplastic core. A 60 mil core of PPO, GE Noryl brand EN 265, was surrounded on either side by four five-mil layers of Newport Adhesives carbon reinforced prepreg NCT-301-G150. The resulting 100 mil uncured flat sheet laminate was placed into a platen press heated to approximately 275° F. A pressure of approximately 40 psi was applied to the two piece mold for 30 minutes. The resulting flat sheet laminate composite was removed from the press with the thermoset substantially cured.

The laminate was then tested for bond strength between the thermoplastic core and the prepreg, x-ray absorbance and electrical conductivity. A single lap shear test was performed with the results indicating bond strengths of greater than 500 psi.

The x-ray absorbency of the composite was tested by placing the 100 mil laminate was placed in a testing chamber and bombarded by radiation energy. MoKα radiation was used with α1 radiation of 17.479 keV and α2 radiation of 17.374 keV. The ratio of α1 to α2 was 2:1. By measuring the initial energy level bombarding the composite and the energy the passed through the composite, a highly satisfactory absorbance coefficient ($\mu$) of 0.9354 $cm^{-1}$ was observed.

The resulting composite laminate exhibited several unexpected and useful properties. The present invention provides a remarkably stiff and strong composite of amorphous thermoplastic and carbon reinforced prepreg that can be molded into various complex shapes in a single step process. These low cost laminates are quick curing and provide a 100 mil laminate that is durable and retains a great deal of stiffness and resists bending due to the carbon reinforcement in the outer layers of the laminate.

EXAMPLE 2

The general procedure of Example 1 was repeated, using matched molds of a complex, non-planar shape. The resulting molded composite was tested and found to exhibit excellent performance characteristics as found in Example 1.

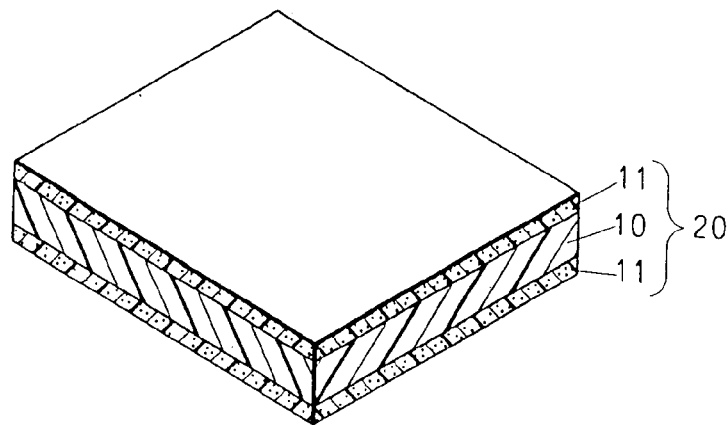

I claim:

1. A complex, non-planar molded composite material of substantially uniform thickness comprising:
   a. a core of substantially amorphous thermoplastic and
   b. at least one outer layer of thermosetting resin bonded to each surface of the core,
   wherein the core material and each outer layer are interfacially commingled to provide a bond strength of greater than about 500 psi while preserving the integrity of the core and outer layers.

2. A complex molded composite of claim 1 wherein the thermoplastic comprises at least one styrene containing polymer.

3. A complex molded composite of claim 1 wherein the thermoplastic comprises polyphenylene oxide.

4. A complex molded composite of claim 1 wherein the thermoplastic comprises polyether imide.

5. A complex molded composite of claim 1 wherein at least one outer layer consists essentially of fiber reinforced thermosetting resin having a curing temperature of less than the melting point of the core material and greater than the glass transition temperature of the core material.

6. A complex molded composite of claim 5 wherein the thermoplastic comprises at least one styrene containing polymer.

7. A complex molded composite of claim 5 wherein the thermoplastic comprises polyphenylene oxide.

8. A complex molded composite of claim 5 wherein the thermoplastic comprises polyether imide.

9. A complex, non-planar molded composite material of substantially uniform thickness comprising:
   a. a core of substantially amorphous thermoplastic and
   b. at least one outer layer of fiber reinforced thermosetting resin having a curing temperature of less than the melting point of the core material and greater than the glass transition temperature of the core material, bonded to each surface of the core,
   wherein the core material and each outer layer are interfacially commingled to provide a bond strength of greater than about 500 psi while preserving the integrity of the core and outer layers.

10. A complex molded composite of claim 9 wherein the thermoplastic comprises at least one styrene containing polymer.

11. A complex molded composite of claim 9 wherein the thermoplastic comprises polyphenylene oxide.

12. A complex molded composite of claim 9 wherein the thermoplastic comprises polyether imide.

13. A substantially flat molded composite material of substantially uniform thickness comprising:
   a. a core of substantially amorphous thermoplastic and
   b. at least one outer layer of fiber reinforced thermosetting resin bonded to each surface of the core,
   wherein the core material and each outer layer are interfacially commingled to provide a bond strength of greater than about 500 psi while preserving the integrity of the core and outer layers.

14. A substantially flat molded composite of claim 13 wherein the thermoplastic comprises at least one styrene containing polymer.

15. A substantially flat molded composite of claim 13 wherein the thermoplastic comprises polyphenylene oxide.

16. A substantially flat molded composite of claim 13 wherein the thermoplastic comprises polyether imide.

17. A process for the preparation of a complex molded composite material comprising assembling, in matched molds having a complex shape:
   a. a core of substantially amorphous thermoplastic and
   b. at least one outer layer of thermosetting resin adjacent each surface of the core,
   and applying heat and pressure to the assembled components sufficient to cure the thermosetting resin and form an interdiffusional bond at the interface between the core and each outer layer while preserving the integrity of the core and outer layers.

18. A process of claim 17 wherein at least one outer layer is fiber-reinforced thermosetting resin.

19. A process of claim 17 wherein each outer layer is fiber-reinforced thermosetting resin.

20. A process of claim 17 wherein the molded composite material is constructed of alternating layers substantially amorphous thermoplastic and fiber-reinforced thermosetting resin.

* * * * *

UNITED STATES PATENT AND TRADEMARK OFFICE
CERTIFICATE OF CORRECTION

PATENT NO. : 6,447,880 B1
DATED : September 10, 2002
INVENTOR(S) : Daniel David Coppens It is certified that error appears in the above-identified patent and that said Letters Patent is hereby corrected as shown below:

The title page, should be deleted and substitute therefore the attached title page.

Signed and Sealed this

Seventh Day of September, 2004

JON W. DUDAS
*Director of the United States Patent and Trademark Office*

(12) United States Patent
Coppens

(10) Patent No.: US 6,447,880 B1
(45) Date of Patent: Sep. 10, 2002

(54) COMPOSITE LAMINATES AND THEIR PREPARATION

(75) Inventor: Daniel David Coppens, Newark, DE (US)

(73) Assignee: Anholt Technologies, Inc., Avondale, PA (US)

(*) Notice: Subject to any disclaimer, the term of this patent is extended or adjusted under 35 U.S.C. 154(b) by 0 days.

(21) Appl. No.: 09/399,883

(22) Filed: Sep. 21, 1999

(51) Int. Cl.$^7$ .......................... B32B 27/12; B32B 27/08
(52) U.S. Cl. ..................................... 428/174; 428/301.4
(58) Field of Search .......................... 428/301.4, 174; 156/196

(56) References Cited

U.S. PATENT DOCUMENTS

| | | | | |
|---|---|---|---|---|
| 4,443,507 A | * | 4/1984 | Yamada et al. | 428/114 |
| 4,950,532 A | * | 8/1990 | Das et al. | |
| H1542 H | * | 6/1996 | Elmendorp et al. | 428/904 |

FOREIGN PATENT DOCUMENTS

| | | | | |
|---|---|---|---|---|
| EP | 391581 | * | 10/1990 | B32B/7/10 |
| GB | 1301023 | * | 12/1972 | B32B/27/04 |

* cited by examiner

Primary Examiner—Elizabeth M. Cole
(74) Attorney, Agent, or Firm—Huntley & Associates

(57) ABSTRACT

A process of making a complex, non-planar molded composite material from an amorphous thermoplastic and thermosetting resin.

20 Claims, No Drawings